United States Patent [19]

Bräkelmann

[11] Patent Number: 4,461,318
[45] Date of Patent: Jul. 24, 1984

[54] DOUBLE SEAT VALVE

[75] Inventor: Wolfgang Bräkelmann, Unna-Lünern, Fed. Rep. of Germany

[73] Assignee: Holstein und Kappert GmbH, Dortmund, Fed. Rep. of Germany

[21] Appl. No.: 351,139

[22] Filed: Feb. 22, 1982

[30] Foreign Application Priority Data

Feb. 21, 1981 [DE] Fed. Rep. of Germany ....... 3106514
Feb. 21, 1981 [DE] Fed. Rep. of Germany ....... 3106578

[51] Int. Cl.³ .............................................. F16K 1/44
[52] U.S. Cl. ........................... 137/614.19; 137/614.11; 137/240; 137/312
[58] Field of Search ................. 137/240, 312, 614.11, 137/614.19

[56] References Cited

U.S. PATENT DOCUMENTS

| 4,344,453 | 8/1982 | Tuchenhugen et al. | 137/614.11 |
| 4,360,039 | 11/1982 | Jeppsson | 137/240 |
| 4,368,753 | 1/1983 | Brakelmann et al. | 137/240 |
| 4,373,545 | 2/1983 | Knappe | 137/614.19 |

FOREIGN PATENT DOCUMENTS 2262727  6/1974  Fed. Rep. of Germany ...... 137/312

Primary Examiner—A. Michael Chambers
Attorney, Agent, or Firm—Michael J. Striker

[57] ABSTRACT

A double seat valve comprises a housing having a fluid inlet, a fluid outlet and two axially displaced valve seats between the inlet and the outlet. A pair of valve discs are moveable independent from each other between open and closed positions with respect to the valve seats, one of the valve discs engaging during its opening movements the other of the valve discs and forming in the closed position with the other valve disc a chamber from which a leak fluid passage leads to the surrounding air. A tubular displacement rod is connected at one end to the one valve disc and extends with a radially enlarged end portion into a cylinder of a main displacement mechanism which is axially displaced from the housing. The radially enlarged portion forms at the junction with the remainder of the tubular rod a shoulder and a piston is connected axially displaced from the shoulder to the enlarged portion. A first coil compression spring cooperates with the piston and the tubular connecting rod for biasing the one valve disc to the closed position. A second displacement rod connected to the other valve disc extends through the tubular connecting rod and through an opening in the piston beyond the latter. A second coil spring located in the enlarged portion engages with one end the shoulder and with the other end a ring coaxially fixed to the second displacement rod. Stroke assuring means are provided which may be constituted by the second compression spring when compressed to a block or by a second shoulder in the enlarged portion and engageable with the peripheral portion of the ring.

13 Claims, 2 Drawing Figures

DOUBLE SEAT VALVE

BACKGROUND OF THE INVENTION

The invention relates to a double seat valve with a leakage control and two valve discs which are displaceable independently of each other, in which one of the valve discs of a smaller outside diameter than the other, is abutable after moving through a predetermined distance in opening direction against the other and forming with the latter a chamber from which a leakage fluid conduit extends to the open air, and wherein the displacement rod of the larger valve disc extends through the tubular displacement rod of the smaller valve disc, and in which both displacement rods form a stroke assuring means and a spring abutment.

Such a double seat valve is for instance known from the German Auslegeschrift No. 2 632 587. In this known construction the end of the hollow displacement rod, which concentrically surrounds the other displacement rod and which extends upwardly from the valve housing, is formed outside the valve housing as a connecting piece which accommodates the lower connection face for connecting the stroke assuring means and a spring abutment. The actual main displacement rod extends from this connecting piece to a displacement cylinder located thereabove. By sandwiching the connecting piece with the stroke assuring means and spring abutment between the actual valve housing and the displacement mechanism located thereabove, a large overall height is necessarily produced, which is connected with considerable disadvantages, especially if a double seat valve of this type is used in a valve complex or even at other places where a low overall height is desirable.

SUMMARY OF THE INVENTION

It is an object of the present invention to provide a double seat valve of the above-mentioned kind in which the overall height of the valve is reduced as compared with the valve known in the art by the height of the restoring spring of one valve disc and the dimensions required for the stroke assuring means.

With these and other objects in view, which will become apparent as the description proceeds, the double seat valve with the leak control means according to the present invention mainly comprises housing means forming an inlet and an outlet and between the inlet and the outlet a pair of axially displaced valve seats, one of which has a smaller diameter than the other, a pair of valve discs moveable independently from each other between a closed position engaging the valve seats and an open position, one of said valve discs being coordinated with the one valve seat and having a smaller diameter than the other valve disc, the valve discs being in the closed position axially displaced from each other to form a chamber therebetween and said one valve disc when moved to the open position engages the other valve disc to move the latter likewise to the open position, leak fluid passage means leading from the chamber to the surrounding air, main displacement means including a cylinder axially displaced from the housing means, first actuating means for moving the one valve disc between the positions thereof and including a tubular displacement rod connected to the one valve disc and projecting into said main displacement means, a piston connected to an upper portion of the tubular displacement rod and guided in the cylinder, and spring means cooperating with the piston for biasing the one valve disc to the closed position, second actuating means for moving the other valve disc between the positions thereof and including a second actuating rod projecting from said other valve disc through the tubular displacement rod likewise into said cylinder of the main displacement means and through an opening in the piston beyond the latter, restoring compression spring means in the region of the main displacement means, a pair of axially displaced abutment means respectively provided on the tubular displacement rod and said second displacement rod, said compression spring means having opposite ends respectively abutting against said pair of abutment means, and stroke assuring means in the region of said abutment means.

In a preferred construction, the tubular displacement rod has in the aforementioned cylinder of the main displacement means a radially enlarged portion connected at one end to the aforementioned piston and forming at the other end at its junction with the remainder of the tubular displacement rod a shoulder constituting one of the abutment means, whereas the other of the abutment means is constituted by a ring axially displaced from the shoulder and coaxially fixed to the second displacement rod. The radially enlarged portion forms a housing for the restoring compression spring.

The stroke assuring means may be constituted by the aforementioned coil compression spring when the latter during movement of the tubular displacement rod and the second displacement rod relative to each other is compressed to a block.

On the other hand, the radially enlarged portion may be formed between the shoulder and the ring with a second shoulder adapted to be engaged by the ring during movement of the tubular displacement rod and the second displacement rod relative to each other, which second shoulder together with the ring forms the stroke assuring means.

Preferrably the second displacement rod extends with clearances through the tubular displacement rod and this clearance forms part of the leak fluid passage means.

The arrangement according to the present invention permits to arrange the restoring spring and the stroke assuring means directly in the cylinder of the main displacement means, which results in a considerable reduction of the overall height which was hitherto conventional and unavoidable with such valves. Considerable advantages arise hereby, especially if such double seat valves are incorporated in valve complexes which comprises a plurality of individual valves which are located besides and above one another.

It is a further object of the present invention to facilitate the assembly of the various parts of the valve, especially the assembly of the tubular displacement rod with the piston and the one valve disc.

Up to now it was usual to make the tubular displacement rod out of two parts, one integral with the piston and the other integral with the one valve disc and to threadingly connect the two parts at adjacent ends. In such a case a perfectly secure threaded connection has to be provided since, if the thread works loose, the actual position of the one valve disc is undesirably affected and can not be detected despite still functioning valve disc position indicating means. It has therefore already been suggested to join the ends of the two parts of the displacement rod by a coupling clamp. To such an arrangement an annular groove is formed adjacent the free end of one of the parts which is superimposed by slots formed in the other parts in which the corresponding coupling clamp is held. The slots and especially the annular groove weaken the corresponding parts, so that special provisions have to be made in the groove base to reduce stress concentration.

The present invention also provides for an arrangement in which the tubular displacement rod is divided between the main displacement mechanism and the valve housing into two parts having abutting ends which are connected by detachable connecting elements comprising at least two coupling halves held together by a surrounding screw clamp.

Even though the coupling halves engage also in annular grooves formed adjacent the abutting ends, these grooves need only to have a very small depth so that a weakening of the displacement rod as per the prior art is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
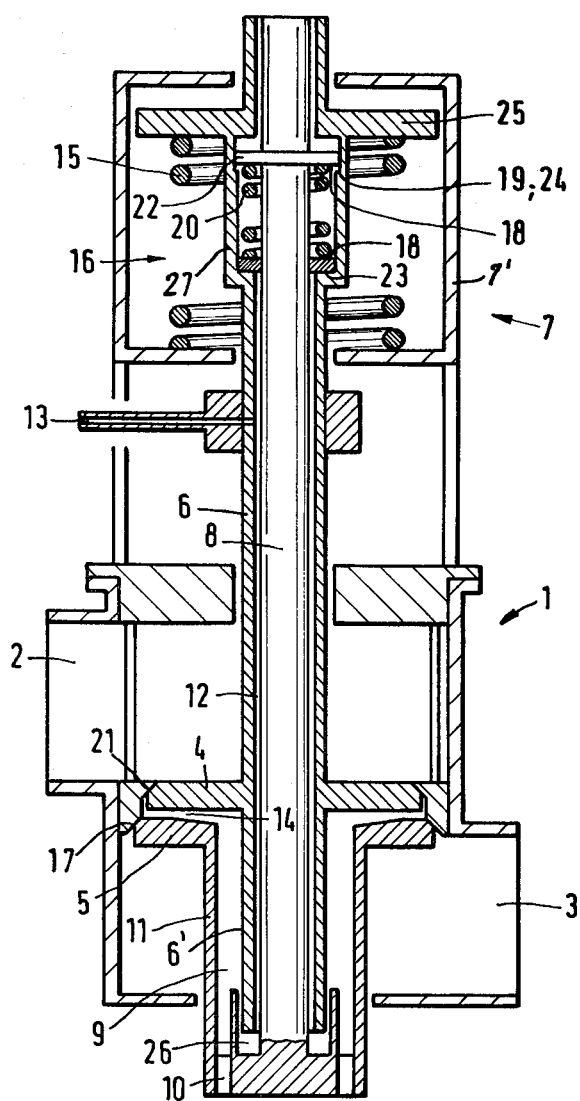
FIG. 1 illustrates a longitudinal cross section of a valve according to the present invention.

Referring now to the FIG. 1, it will be seen that the valve according to the present invention comprises a valve housing 1, which may be constructed of two parts and having a fluid inlet 3 and a fluid outlet 2 and being provided between the inlet and the outlet with a pair of axially displaced valve seats 21 and 17, of which the valve seat 21 has a smaller diameter than the valve seat 17. A pair of valve discs 4 and 5 are arranged in the housing 1 moveable independent from each other between a closed position engaging the respective valve seat and an open position. The valve is preferably mounted in a vertical position and in this position the upper valve disc 4, which is coordinated with the valve seat 21, has a smaller diameter than the valve disc 5 coordinated with the valve seat 17. The upper valve disc 4 is connected with a tubular displacement rod 6 which projects upwardly out of the housing 1 into the region of a main displacement mechanism 7 upwardly displaced from the housing 1. A second displacement rod 8, connected to the valve disc 5, extends with clearance coaxially through the hollow displacement rod 6 likewise into the region of the main displacement mechanism 7. The second displacement rod 8 is connected in its lower region with a leakage discharge conduit 9 by means of webs 10. The leakage discharge conduit 9 is formed by the inner surface of a pipe 11 extending downwardly from the valve disc 5 and the outer surface of a portion 6' of the tubular displacement rod 6 projecting downwardly from the valve disc 4.

The hollow displacement rod 6 and the second displacement rod 8 form an annular gap 12 which leads from a cleaning fluid connection 13 communicating at its inner end with the aforementioned annular gap 12 to the bottom end of the portion 6' of the tubular connecting rod to beneath a chamber 14 formed between the valve discs 4 and 5 in the closed position of the latter. An outlet conduit 26 deflects cleaning fluid upwardly and communicates with the annular gap 12 and the chamber 14.

As already stated, the two displacement rods 6 and 8 extend into the region of the main displacement mechanism 7. The main displacement mechanism 7 includes a cylinder 7' and a piston 25 guided in the aforementioned cylinder is connected to an upper portion of the tubular displacement rod 6. Spring means 15, preferably in the form of a coil compression spring cooperate with the piston 25 for biasing the valve disc 4 connected with the tubular displacement rod 6 to the closed position. The tubular displacement rod 6 has, within the space 16 defined by the coil compression spring 15, a radially enlarged portion 27 connected at its upper end to the piston 25 and forming at its lower end, upwardly displaced from the bottom of the cylinder 7', at the junction with the remainder of the hollow displacement rod 6 an inwardly extending shoulder 23, forming an abutment for one end of a coil compression spring 20, the other end of which abuts against an abutment ring 22 coaxially fixed upwardly displaced from the shoulder 23 to the second displacement rod 8. The enlarged portion 27 of the tubular displacement rod 6 forms a housing for the spring 20 and the latter has the task to press the valve disc 5 of larger diameter against the valve seat 17, respectively to press the valve disc 5 during movement of the valve disc 4 to the open position against the valve disc 4.

Stroke assuring means 19 are also provided within the radially enlarged portion 27 of the tubular displacement rod 6. Such stroke assuring means may be constituted by a second shoulder 24 in the tubular enlarged portion 27 which is downwardly displaced through a small distance from the bottom face of the abutment ring 22 and which is engaged by the latter during movement of the displacement rod 8 relative to the hollow displacement rod 6. On the other hand, the stroke assuring means 19 may also be constituted by the coil compression spring 20 when the latter is compressed to a block during movement of the two displacement rods relative to each other. The tubular displacement rod 6 extends with a portion thereof closely guided through a top wall of the cylinder 7' and the displacement rod 8 projects upwardly beyond the abutment ring 22 through this portion of the tubular displacement rod 6.

If now the upper surface of the piston 25 is impinged in a known manner not shown in the drawing, with pressure fluid, the tubular connecting rod 6 is moved in downward direction so that the valve disc 4 is downwardly displaced from its seat 21 to engage after travelling a short distance the lower valve disc 5 so as to downwardly displace the latter against the force of the spring 20, whereby the volume of the chamber 14 is reduced. This chamber 14 is connected through the pipe 11 with the leakage fluid line which extends downwardly from the valve housing 1. When this region is being cleaned, the cleaning fluid is conducted through the cleaning connection 13, the annular passage 12 and the associated outlet conduit along the wall of the hollow displacement rod 6 and reaches the chamber 14, from which the cleaning fluid flows out along the opposite wall of the pipe 11. If the valve is closed, that is when both valve discs 4 and 5 engage their associated seats, cleaning fluid can also act upon the larger hollow chamber 14 then formed.

The stroke assuring means which is incorporated within the spring housing 27 seeks to prevent the lower valve disc 5 from seizing in the open position. As soon as both valve discs 4 and 5 are moved from the open position to the closed position, the lower valve disc 5 is moved by the action of the compression spring 20. If, for some reasons, however, the valve disc 5 should seize or jam in the open position, then in accordance with the embodiment shown, the stop face 24 abuts against the stop ring 27 and thereby releases the valve disc 5 from its locked position, so that the valve disc 5 can be moved again into its proper position by the action of the compression spring 20. As mentioned before, the stroke ensuring action may also be achieved by the compression spring 20 if the latter is designed in such a manner that in the open position of both valves the windings of the compression spring 20 are compressed to a block.

Figure 2:
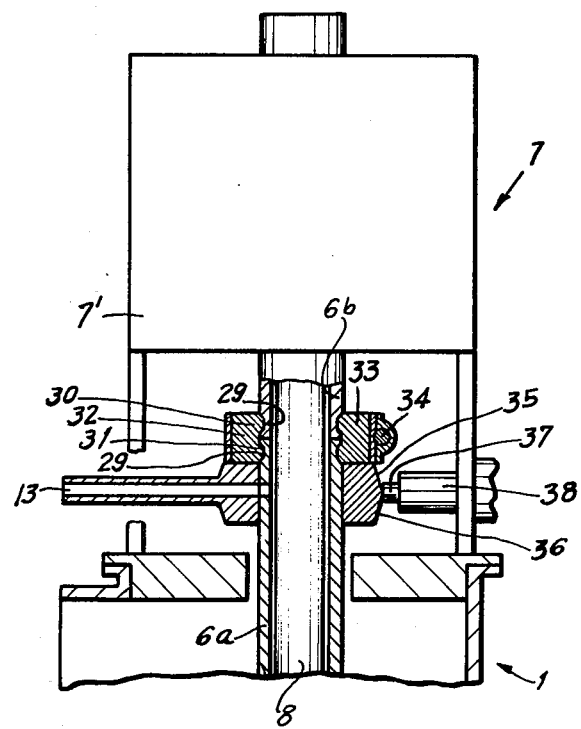
FIG. 2 partially illustrated, partly in longitudinal cross section, the valve of FIG. 1 with a divided tubular displacement rod and coupling means connecting the two parts of the tubular displacement rod.

FIG. 2 illustrates a slight modification of the valve illustrated in FIG. 1, in which the tubular displacement rod 6 is divided between the cylinder 7' of the main displacement mechanism 7 and the valve housing 1 into two parts 6a and 6b which abut at the free ends thereof against each other.

It is to be understood that the main displacement mechanism 7 shown in FIG. 2 contains all the elements as clearly shown in FIG. 1 and described in the preceeding part of the specification. The same holds true with regard to the valve housing 1, only partly shown in FIG. 2. The part 6a of the tubular connecting rod is therefore integrally connected at its lower end, not shown in FIG. 2, with the valve disc 4, whereas the part 6b is provided in its upper region with the radially enlarged portion 27 to the upper end of which the piston 25 is connected. The two parts 6a and 6b abut with planar end faces normal to the axes of the parts 6a, 6b against each other, so that the axial valve opening pressure is transmitted through these end faces. The two parts 6a and 6b are respectively formed adjacent the abutting end faces with very shallow circumferential grooves 28 and 29 of a depth less than half of the wall thickness of the tubular parts, into which corresponding annular beads 30 and 31 of two coupling halves 32 and 33 engage. The peripheral outer surfaces of the coupling halves 32 and 33 are surrounded and held together by a screw clamp 34 of known construction and only schematically illustrated in FIG. 2.

FIG. 2 also illustrates an arrangement for indicating the position of the valve disc 4. For this purpose the member carrying the cleaning connection 13 is mounted on the lower part 6a of the divided tubular displacement rod and provided on the side thereof opposite the side from which the cleaning connection 13 projects with mutually inclined abutment faces 35 and 36 against which a feeler pin 37 of an impulse transmitter 38 is adapted to abut. This arrangement will assure that, at a possible loosening of the coupling holding the free ends of the parts 6a and 6b in abutting relationship, the feeler pin 37 will indicate this fault, since the feeler pin will indicate the position of the valve disc 4 and not that of the control piston 25.

It will be understood that each of the elements described above, or two or more together, may also find a useful application in other types of double seat valves differing from the types described above.

While the invention has been illustrated and described as embodied in a double seat valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A double seat valve with leak control means comprising housing means forming an inlet and an outlet and between said inlet and said outlet a pair of axially displaced valve seats, one of which has a smaller diameter than the other; a pair of valve discs moveable independent from each other between a closed position engaging said valve seats and an open position, one of said valve discs being coordinated with said one valve seat and having a smaller diameter than the other valve disc, said valve discs being in said closed position axially displaced from each other to form a chamber therebetween and said one valve disc when moved to said open position engages the other valve disc to move the latter likewise to said open position; leak fluid passage means leading from said chamber to the surrounding air; main displacement means including a cylinder axially displaced from said housing means; first actuating means for moving said one valve disc between said positions thereof and including a tubular displacement rod connected to said one valve disc and projecting into said main displacement means, a piston connected to an upper portion of said tubular displacement rod and guided in said cylinder, so that the structural height of said main displacement means is reduced and thereby reduces the overall height of the double seat valve; and spring means cooperating with said piston for biasing said one valve disc to said closed position; and second actuating means for moving the other valve disc between the positions thereof and including a second actuating rod projecting from said other valve disc through said tubular displacement rod likewise into said cylinder of said main displacement means and through an open end in said piston beyond the latter; compression spring means in the region of said main displacement means; a pair of axially displaced abutment means respectively provided on said tubular displacement rod and said second displacement rod, said compression spring means having opposite ends respectively abutting against said pair of abutment means; and stroke assuring means for preventing seizing of said other valve disc in the open position and arranged in the region of said abutment means, so that by arranging said abutment means and stroke assuring means in the same region there is a considerable reduction in overall height of the double seat valve while assuring the necessary dimensions for securing the stroke.

2. A double seat valve as defined in claim 1, wherein said tubular displacement rod has in said cylinder of said main displacement means a radially enlarged portion connected at one end to said piston and forming at the other end at its junction with the remainder of said tubular displacement rod a shoulder constituting one of said abutment means, the other abutment means being constituted by a ring axially displaced from said shoulder and coaxially fixed to said second displacement rod, said radially enlarged portion forming a housing for said compression spring.

3. A double valve seat as defined in claim 1, wherein said compression spring is a coil compression spring, said stroke assuring means being constituted by said coil compression spring when the latter during movement of said tubular displacement rod and said second displacement rod relative to each other said coil compression spring is compressed to a block.

4. A double seat valve as defined in claim 2, wherein said radially enlarged portion forms between said shoulder and said ring a second shoulder adapted to be engaged by said ring during movement of said tubular displacement rod and said second displacement rod relative to each other and constituting together with said ring said stroke assuring means.

5. A double seat valve as defined in claim 1, wherein said second displacement rod extends with clearance through said tubular displacement rod, said clearance forming part of said leak fluid passage means.

6. A double seat valve as defined in claim 1, wherein said tubular connecting rod is divided between the valve housing and the main displacement means into two parts and including detachable connecting elements comprising at least two coupling halves and means surrounding the outer peripheral surface of the coupling halves and for retaining the same in place.

7. A double seat valve as defined in claim 6, wherein the said two parts abut with planar end faces against each other.

8. A double seat valve as defined in claim 7, wherein one of said two parts is integrally connected at its end opposite the end face thereof with said one valve disc and the other of said two parts is integrally connected at its end opposite from the end faces thereof with said piston.

9. A double seat valve as defined in claim 8, wherein said leakage fluid passage means comprises a member carrying a cleaning fluid connection communicating with said cleaning fluid passage means, said member being mounted on said one part of said divided tubular displacement rod and being provided with inclined faces and including an impulse transmitter having a feeler pin engaging said inclined faces.

10. The valve as defined in claim 1, wherein said spring means is disposed entirely within said cylinder.

11. The valve as defined in claim 1, wherein said pair of axially displaced abutment means is disposed entirely within said cylinder.

12. The valve as defined in claim 1, wherein said stroke assuring means is disposed entirely within said cylinder.

13. A double seat valve with leak control means comprising housing means forming an inlet and an outlet and between said inlet and said outlet a pair of axially displaced valve seats, one of which has a smaller diameter than the other; a pair of valve discs moveable independent from each other between a closed position engaging said valve seats and an open position, one of said valve discs being coordinated with said one valve seat and having a smaller diameter than the other valve disc, said valve discs being in said closed position axially displaced from each other to form a chamber therebetween and said one valve disc when moved to said open position engages the other valve disc to move the latter likewise to said open position; leak fluid passage means leading from said chamber to the surrounding air; main displacement means including a cylinder axially displaced from said housing means; first actuating means for moving said one valve disc between said positions thereof and including a tubular displacement rod connected to said one valve disc and projecting into said main displacement means, a piston connected to an upper portion of said tubular displacement rod and guided in said cylinder, and spring means cooperating with said piston for biasing said one valve disc to said closed position; second actuating means for moving the other valve disc between the positions thereof and including a second actuating rod projecting from said other valve disc through said tubular displacement rod likewise into said cylinder of said main displacement means and through an open end in said piston beyond the latter; compression spring means in the region of said main displacement means; a pair of axially displaced abutment means respectively provided on said tubular displacement rod and said second displacement rod, said compression spring means having opposite ends respectively abutting against said pair of abutment means; stroke assuring means for preventing seizing of said other valve disc in the open position and arranged in the region of said abutment means, and said tubular connecting rod being divided between said valve housing and said displacement means into two parts and including detachable connecting elements comprising at least two coupling halves and means surrounding the outer peripheral surface of said coupling halves and for retaining the same in place.

* * * * *